H. G. MOBLEY.
AUTOMATIC AIR AND GAS RELIEF VALVE FOR OIL DISTRIBUTING SYSTEMS.
APPLICATION FILED APR. 16, 1920.
1,379,309.
Patented May 24, 1921.
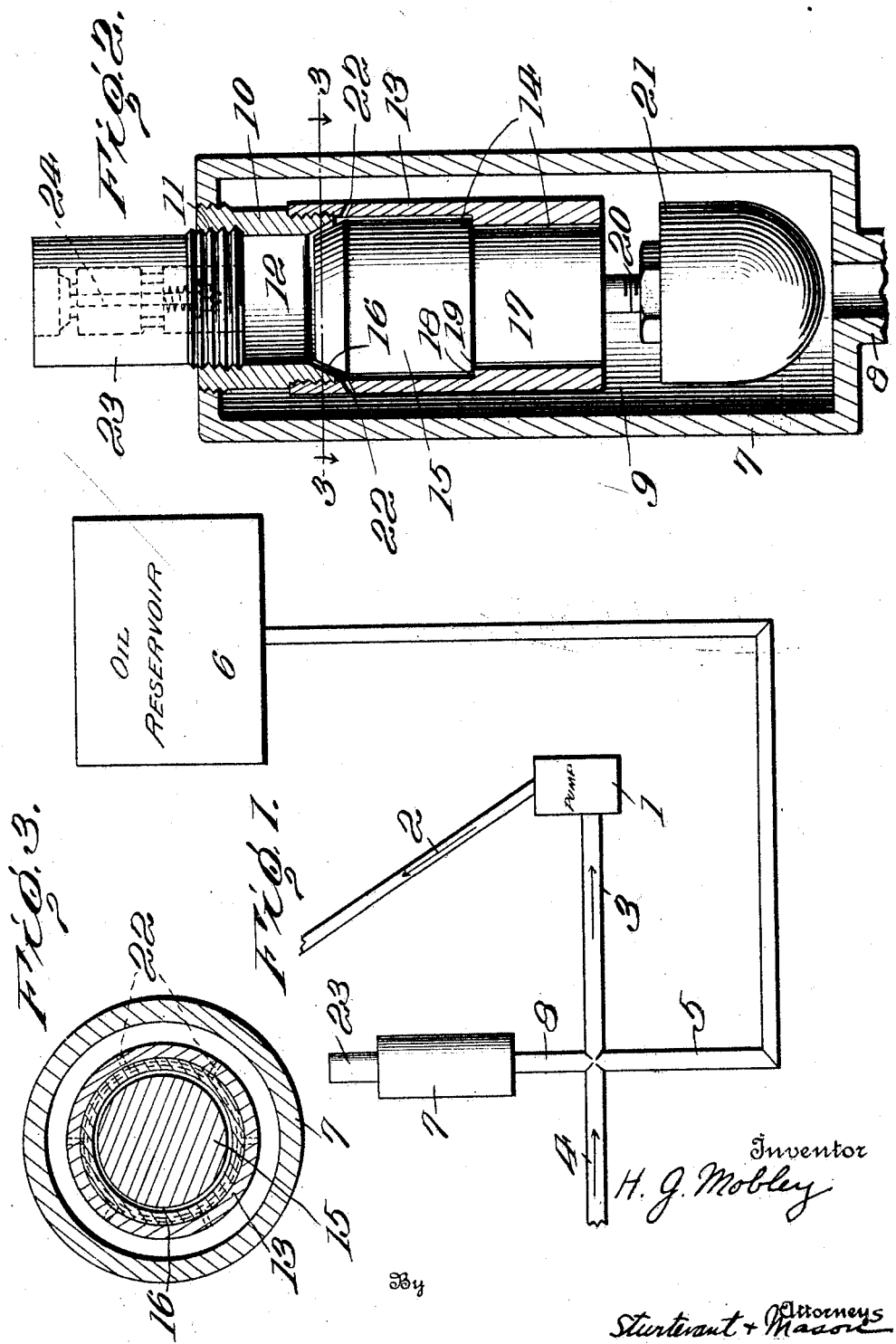

UNITED STATES PATENT OFFICE.

HENRY GRADY MOBLEY, OF VALLEY MILLS, TEXAS.

AUTOMATIC AIR AND GAS RELIEF VALVE FOR OIL-DISTRIBUTING SYSTEMS.

1,379,309.  Specification of Letters Patent.  Patented May 24, 1921.

Application filed April 16, 1920. Serial No. 374,455.

*To all whom it may concern:*

Be it known that I, HENRY GRADY MOBLEY, a citizen of the United States, residing at Valley Mills, in the county of Bosque, State of Texas, have invented certain new and useful Improvements in Automatic Air and Gas Relief Valves for Oil-Distributing Systems, of which the following is a description, reference being had to the accompanying drawing and to the figures of reference marked thereon.

This invention relates to oil distributing systems, and more particularly to devices for permitting air and gas entrained with the oil in such systems to escape without the unintentional discharge of the oil.

In many of the existing oil piping systems, oil is pumped from a distant source, sometimes forty or fifty miles, to a desired point, and is at that point, pumped to an ultimate place by a pump located at the aforesaid desired point. In connection with this latter pump, is arranged a large oil reservoir located above and adapted to receive the discharge from the distant pump when the pump at the desired point is not forcing oil to the place of ultimate discharge, and this reservoir, on the other hand, acts as a supply tank to feed oil by gravity to the pump located at the desired point when the distant pump is not forcing oil along the system. Due to the accumulation of air and gas in the oil conduits connecting with the distant pump or source of supply, a great quantity of air is forced to this second pump located at the desired point, and in many instances, these pumps have been known to operate for hours getting rid of this accumulation of air or gas before they will again operate to force the oil to the place of ultimate discharge.

It is to obviate this defect that the present air and gas relief valve has been designed. In the present invention this valve is disposed in the suction line in front of the pump located at the desired point, which conduit connects with both the oil line coming from the distant point and also with the gravity line leading from the auxiliary tank, so that the valve chamber is in constant communication with the supply of oil. The valve is constructed to automatically relieve the system of the entrained air or gas without the discharge of oil through the valve.

The specific form of the valve used in connection with this system is provided with a float, and is further provided with a relatively long guiding surface to accurately guide the valve in its shifting movement caused by the rise and fall of the float, whereby a perfect seating of the valve is assured.

A further aim of this invention is to provide such a float operated valve of the character described, made in the simplest manner, of the fewest number of parts, to permit the most efficient automatic discharge of air and gas from the system.

These and other objects will in part be obvious and will in part be hereinafter more fully disclosed.

Referring now to the accompanying drawing:—

Figure 1 is a fragmentary diagrammatic representation of the improved oil piping system showing the air and gas relief valve connected to the juncture of the suction line, the gravity line, and the discharge line;

Fig. 2 is a longitudinal section of the specific form of valve, and

Fig. 3 is a section on the line 3—3 of Fig. 2, to illustrate the slots connecting the interior of the casing with the air outlet.

Referring more particularly to the accompanying drawing, the main pump 1 is adapted to force oil through the conduit 2 to any ultimate place of discharge. This pump is supplied by means of a suction line 3 having connection with a discharge line 4 leading from a source of supply located at a distant point, which, in some instances, is forty or fifty miles away. Oil is thus forced through this line 4 from a distant source of supply, either by gravity flow or by a suitable pump, not shown. Connected to the suction line 3 and the discharge line 4, is a gravity line 5 communicating with an oil reservoir 6 elevated above the plane of the pump 1. This reservoir, which in these systems, is generally capable of holding anywhere from fifty to fifty thousand barrels of oil, acts as an auxiliary tank to receive the discharge from the distant line 4 through the gravity line 5 when the pump 1 is not operating to force oil to the ultimate place of discharge. Furthermore, due to this elevation, this reservoir 6 provides a gravity flow of oil to the pump 1 when the pump located at a distant point is not discharging through the discharge line 4. Experience has shown that in such a piping system, there accumulates in the long discharge line 4 leading from the source of supply at a distant point, an immense amount of air and gas, which entrained with the flowing oil, must pass through suction line 3 and must be forced through pump 1 to the place of ultimate discharge. Due to this condition, the pump 1 will be forced to pass this air along without functioning the discharge of oil. In many instances, these pumps have been known to pump air for hours at a time. In order to overcome such a serious defect, the improved automatic air and gas relief valve has been designed, and is so constructed and arranged, and by placing it in this system in the suction line 3 leading to the pump 1, it will automatically operate to relieve the system of this obnoxious air and gas without the loss of oil. Furthermore, by placing the valve at such a point in this system, full advantage is taken of the float controlled feature and of the continuous supply of oil flowing either from the distant pump through line 4 or from the gravity flow of oil through reservoir 6 through gravity pipe 5.

Specifically, the valve comprises an airtight casing 7 having an inlet connection 8 at the bottom thereof communicating with the suction line 3, preferably at the juncture of the discharge line 4 and gravity line 5, although such location is not imperative. This casing 7 is constructed to provide an airtight internal chamber 9. At the top the casing 7 is provided with an opening into which is threaded a depending sleeve 10 forming an air outlet 11. It is of course obvious that instead of making this sleeve separate from the casing, it may be made an integral part thereof. Preferably at the lowermost end of the sleeve 10, the same is flared outwardly as at 12 to provide an annular interior valve seat, and substantially at this point, the upper periphery of the sleeve 10 is threaded to receive the interiorly threaded end of a valve guiding sleeve 13 which provides a somewhat elongated bearing and guiding surface 14 for the valve 15.

As illustrated in detail in Fig. 2, this valve 15 is adapted to have limited vertical shifting movement toward and from its seat 12, and at its inner end is beveled as at 16 to correspond with the bevel of the seat. The valve is elongated to provide a relatively long guiding surface 17 to coöperate with the guiding surface 14 of the surrounding sleeve 13. In the preferred form, this sleeve 13 is shouldered as at 18 to coöperate with the projecting shoulder 19 on the valve to provide a stop limiting the downward movement of the valve.

The lower extremity of the valve 15 terminates substantially flush with the sleeve 13, and at this lower point is provided with an integral depending connection 20 having a threaded nut connection with the float 21 of substantially the shape shown. Arranged preferably in the upper part of the sleeve 13 just below the valve seat 12 are a series of annularly arranged slots or openings 22, affording communication from the interior chamber 9 to the air and gas outlet 11 so that air and gas accumulating within the upper portion of this chamber can pass through these openings 22 and out through the outlet 11 when the valve is in unseated position.

Any desirable connection may be made from the outlet 11, such as by means of a short conduit or pipe having connection therewith, and if preferred, the device shown in Fig. 2 may be used. In this illustration, there is shown a short conduit or nozzle 23 threaded into the end of the sleeve 10. This nozzle may or may not be provided with the check valve 24 which is adapted to permit the escape of air and gas, but which will preclude its return into the interior of the casing 7. In the preferred form, this check valve is omitted.

It is obvious that a valve of the above character, is peculiarly adaptable to the present system, inasmuch as oil flowing into the inlet chamber 9 through the connection 8 from either the discharge line 4 or the gravity line 5 tends to continuously keep this chamber 9 filled with oil so that the float 21 is maintained at its elevated position and consequently the valve 16 is retained in this seat 12, the perfect seating of the valve being assured due to the relatively long guiding sleeve coöperating with the similarly shaped guiding surface 16 and 17 of the valve itself.

Whenever air and gas is passed through the discharge line 4, it will be forced along with the oil, and will rise through connection 8 into the inner chamber 9 passing into the top thereof where it accumulates. The gradual accumulation of this air and gas will cause the consequent lowering of the level of oil within the inner chamber 9, and hence the lowering of the float 21 to unseat the valve 12, whereupon such air and gas will escape through the slots 22 into the outlet 11 and thence to atmosphere. With the removal of this pressure on the surface of the liquid, the oil will again automatically rise and reseat valve 12 so that no oil can escape through the opening 11. It will of course be obvious that these communicating slots 22 may be located at any desired point to provide the most effective communication between the top of the chamber 9 and the outlet 11.

Another important and desirable feature of this invention resides in making the superficial area of the float 21 larger than that of the valve 15 so that the valve is very sensitive to differences in pressure.

In some cases, where it is desired to provide the air and gas outlet 11 with a check valve as before described, the same can be readily inserted as illustrated in the drawing. These check valves are sometimes desirable to break the vacuum within the outlet 11 caused by the discharge line 4 becoming clogged so that the suction of the pump 1 will tend to create a vacuum within the chamber 9 and tend to cause the valve to lower.

It is obvious that this valve is adapted for liquid distributing systems other than oil.

It is obvious that minor changes in the details of construction may be made without departing from the spirit of the invention as set forth in the appended claims.

Having thus described the invention, what I claim as new and desire to secure by Letters-Patent, is:—

1. In an oil distributing system, the combination of an oil pump discharging oil to any desired point, a suction line connected to said pump, a gravity line having connection with an oil reservoir and the suction line, a discharge line adapted to force oil under pressure to said suction line, and automatic means in said suction line permitting the escape of air or gas and not oil.

2. In an oil distributing system, the combination of an oil pump discharging oil to any desired point, a suction line connected to said pump, a gravity line having connection with an oil reservoir and said suction line, a discharge line adapted to force oil under pressure to said suction line, a casing connected to said suction line and provided with an outlet, a float operated valve controlling said outlet, said valve being constructed and arranged to be held in closed position when said float is raised by the oil in said casing and to be opened when said float is lowered by the displacement of the oil in said casing by air or gas.

3. An automatic air or gas relief valve for liquid distributing systems comprising a casing having a liquid inlet and an air or gas outlet, a sleeve connected to said outlet and formed with a valve seat, a valve guiding sleeve connected to said first mentioned sleeve, a valve shiftable in said guiding sleeve and adapted in raised position to rest on said valve seat, said valve and guiding sleeve having coöperating parts to limit the downward movement of said valve and a liquid operated float connected to said valve.

In testimony whereof, I affix my signature.

HENRY GRADY MOBLEY.